United States Patent [19]
Nanami

[11] Patent Number: 5,647,779
[45] Date of Patent: Jul. 15, 1997

[54] MANIFOLD AND WATER TRAP SYSTEM FOR MARINE ENGINE

[75] Inventor: Masayoshi Nanami, Hamamatsu, Japan

[73] Assignee: Sanshin Kogyo Kabushiki Kaisha, Hamamatsu, Japan

[21] Appl. No.: 503,992

[22] Filed: Jul. 19, 1995

[51] Int. Cl.$^6$ .......................... B63H 11/00; B63H 23/06; B63H 21/32
[52] U.S. Cl. .............. 440/38; 114/270; 440/75; 440/89; 440/111
[58] Field of Search .................. 440/75, 88, 89, 440/111, 38; 114/270

[56] References Cited

U.S. PATENT DOCUMENTS

| | | | |
|---|---|---|---|
| 2,769,420 | 11/1956 | Horton et al. | 440/75 |
| 3,948,206 | 4/1976 | Tyler | 114/270 |
| 4,565,532 | 1/1986 | Connor | 440/75 |
| 5,096,446 | 3/1992 | Tazaki et al. | 440/89 |
| 5,251,439 | 10/1993 | Nakase et al. | 440/89 |

FOREIGN PATENT DOCUMENTS

| | | | |
|---|---|---|---|
| 279191 | 12/1987 | Japan | 440/75 |
| 403124910 | 5/1991 | Japan | 440/89 |
| 4-201797 | 4/1992 | Japan | 440/75 |

*Primary Examiner*—Sherman Basinger
*Attorney, Agent, or Firm*—Knobbe, Martens, Olson & Bear LLP

[57] ABSTRACT

A personal watercraft having a compact engine arrangement for driving a propulsion device such as a jet pump positioned to the rear of and on the underside of the watercraft. The engine is disposed so that its cylinder block is at an angle to a vertical plane, with the exhaust manifold being positioned on the underside of the cylinder bank. An expansion chamber device is provided at the rear end of the engine and at a height that is higher than the exhaust ports of the engine and the discharge of the exhaust system so as to provide a trap for precluding flow of water to the engine through the exhaust system. This positioning of the engine places its crankshaft in offset relationship to the drive shaft of the propulsion device, and a two-stage step-down transmission drives the drive shaft from the crankshaft.

37 Claims, 5 Drawing Sheets

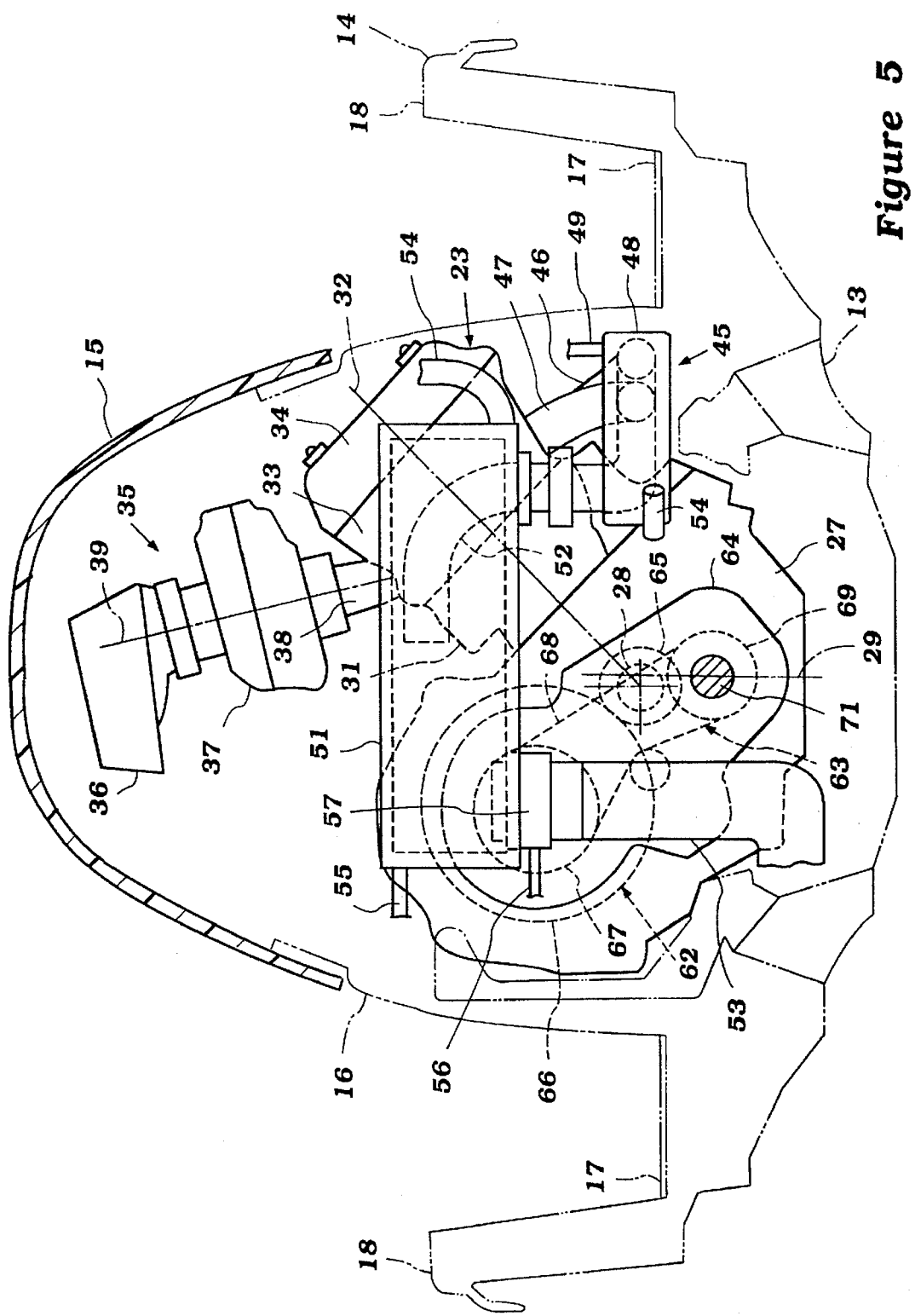

MANIFOLD AND WATER TRAP SYSTEM FOR MARINE ENGINE

BACKGROUND OF THE INVENTION

This invention relates to a marine propulsion unit and more particularly to a manifold and water trap and output shaft arrangement for such an engine.

There is a very popular and rapidly growing segment of the watercraft market for a type of water vehicle called a "personal watercraft." This type of watercraft is designed primarily to be operated by a rider and accommodate a relatively small number of passengers. Frequently, the rider's area is generally open and the watercraft and rider's area is designed so as to be boarded from the body of water in which the watercraft is operating. Obviously, these vehicles are quite compact in nature.

The propulsion systems for these personal watercraft normally include an inboard mounted engine and frequently a jet propulsion unit in the form of a jet pump that is positioned on the underside at the rear of the hull. Oftentimes the engine is positioned at least in part beneath the rider's area and frequently beneath a raised straddle-type seat that runs longitudinally through the center of the rider's area.

This compact construction for the watercraft presents a number of unique design problems. Not the least of these is the layout of the exhaust system for the engine. The problem is rendered particularly acute since, as is typical with marine propulsion systems, the engine exhaust gases are discharged to the atmosphere either at, below or close to the water level at which the watercraft is operating. Thus, care must be taken to ensure that water cannot enter the engine through the exhaust system. This problem is particularly acute since this type of watercraft is very sporting in nature, and the rider and occupants expect the watercraft to capsize at times. When capsized and subsequently righted, there is a problem that water may flow through the exhaust system into the engine with obviously undesirable results.

Although these types of watercraft are often powered by two-cycle crankcase compression internal combustion engines, for a wide variety of reasons, there may be advantages in employing four-cycle engines. However, when four-cycle engines are employed, the engine configuration is generally more bulky than that of a two-cycle engine for obvious reasons. A large percentage of this bulk is created by the fact that unlike two-cycle engines, the induction system and the exhaust system for the engine is normally mounted on the cylinder head. This gives rise to an increased bulk at the top of the engine and makes engine placement, particularly under a rider's seat, difficult, if not impossible.

It is, therefore, a principal object of this invention to provide an improved propulsion unit and layout for a small personal-type watercraft.

It is a further object of this invention to provide an improved engine arrangement for such a watercraft wherein the engine's center of gravity may be kept low and the bulk of the engine reduced.

One way in maintaining a low center of gravity and moving the large bulk of the engine to a lower level where it will permit positioning of a rider's area over it is to cant the engine to one side. If this type of canting arrangement is employed, there are some certain advantages in maintaining the induction system on the high side of the engine. Not the least reason for this is the fact that the induction system generally requires servicing more frequently than the exhaust system. However, if the exhaust system is placed on the low side of the engine, then the water entry problems aforenoted may be increased.

It is, therefore, a still further object of this invention to provide an improved engine arrangement for a marine watercraft wherein the engine may be canted so that the exhaust side is low but wherein protection against water intrusion into the engine through the exhaust system is optimized.

It is a further object of this invention to provide an improved engine and exhaust system arrangement for a watercraft.

As has been previously noted, the typical propulsion system for this type of watercraft employs a jet pump that is disposed on the underside of the hull and toward the rear of the hull. Generally, it is the practice to position the engine so that its output shaft is generally aligned with the impeller shaft of the jet pump so as to facilitate coupling therebetween. However, this has several disadvantages.

First, if it is desired to cant the engine over to one side or the other from the vertical, then it is difficult to maintain the in-line relationship between the engine output shaft and the watercraft drive shaft unless the entire engine is disposed substantially on one side of the longitudinal plane. This one-side positioning of the engine is not desirable because it can adversely affect the balance of the watercraft. If, however, the watercraft engine is canted and its output shaft axis is offset from the drive shaft axis, then some form of transmission must be employed for transferring the drive. In some instances this is not a particular disadvantage because it may be desirable to provide a step-down transmission between the engine output shaft and the impeller shaft.

One reason for this is that high-performance engines normally run at a high engine speed so as to achieve a high output for a given displacement. However, marine propulsion systems such as propellers or impellers for jet pumps can be subject to cavitation if driven at high rates of speed. Therefore, there are advantages in providing a step-down transmission between the engine output shaft and the drive shaft of the watercraft.

However, to provide large speed reductions requires a relatively large transmission, since the ratio between the driving element and the driven element should be relatively large. Although offsetting of the engine output shaft relative to the drive shaft can facilitate this, the normal degree of offsetting does not provide adequate space for a suitable step-down transmission.

It is, therefore, a still further object of this invention to provide an improved engine propulsion unit layout for a watercraft and a step-down transmission therebetween.

SUMMARY OF THE INVENTION

A first feature of this invention is adapted to be embodied in an internal combustion engine for propelling a watercraft. The engine is comprised of a crankcase containing a crankshaft rotatable about an axis for longitudinal disposition in the watercraft. A cylinder bank extends upwardly from the crankcase and is inclined to a vertical plane containing the crankshaft axis. At least one exhaust port is formed in the cylinder bank and faces in a generally downward direction. An exhaust manifold collects exhaust gases from the exhaust port and delivers them in a downward direction and then toward one end of the engine. An expansion chamber device extends transversely across the one end of the engine and receives exhaust gases from the exhaust port. An exhaust pipe discharges the exhaust gases from the expansion chamber to the atmosphere at a point contiguous to the water level at which the watercraft is operating. In accordance with this feature of the invention, the expansion chamber is disposed so that it lies at least in part above the exhaust port so as to form a trap section between the exhaust pipe outlet and the exhaust port that will reduce the likelihood of water entering the engine through the exhaust system.

Another feature of the invention is adapted to be embodied in the propulsion system for a watercraft having a hull. A propulsion device is provided on the underside of the hull and is driven by a drive shaft that extends generally longitudinally within the hull and substantially on its centerline. An internal combustion engine is supported within the hull forwardly of the propulsion device and with an output shaft that rotates about a generally longitudinally disposed axis. The engine is mounted in the hull so that a cylinder bank thereof is inclined to a vertically extending plane containing the axis of rotation of the engine output shaft. This axis is offset to one side of the drive shaft axis. A first transmission transmits drive from the engine output shaft to an intermediate shaft, and a second transmission drives the drive shaft from the intermediate shaft. The intermediate shaft is positioned vertically above the drive shaft and the engine output shaft, and the transmissions effect a step-down in the speed of the drive shaft from that of the engine output shaft.

BRIEF DESCRIPTION OF THE DRAWINGS

FIG. 5 is a cross-sectional view taken along the line 5—5 of FIG. 3.

DETAILED DESCRIPTION OF THE PREFERRED EMBODIMENT OF THE INVENTION

Figure 1:
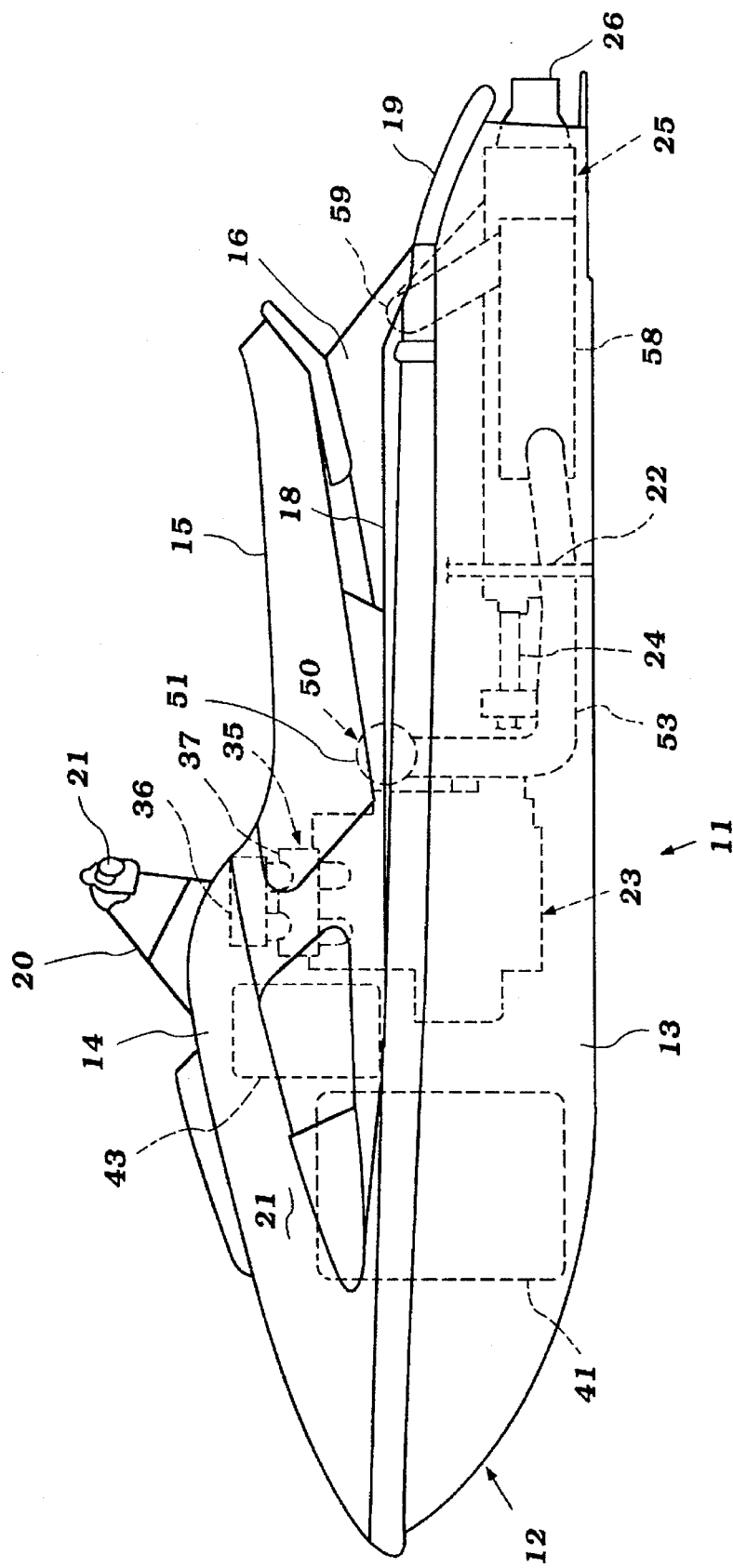
FIG. 1 is a side elevational view of a personal watercraft constructed in accordance with an embodiment of the invention.
Figure 2:
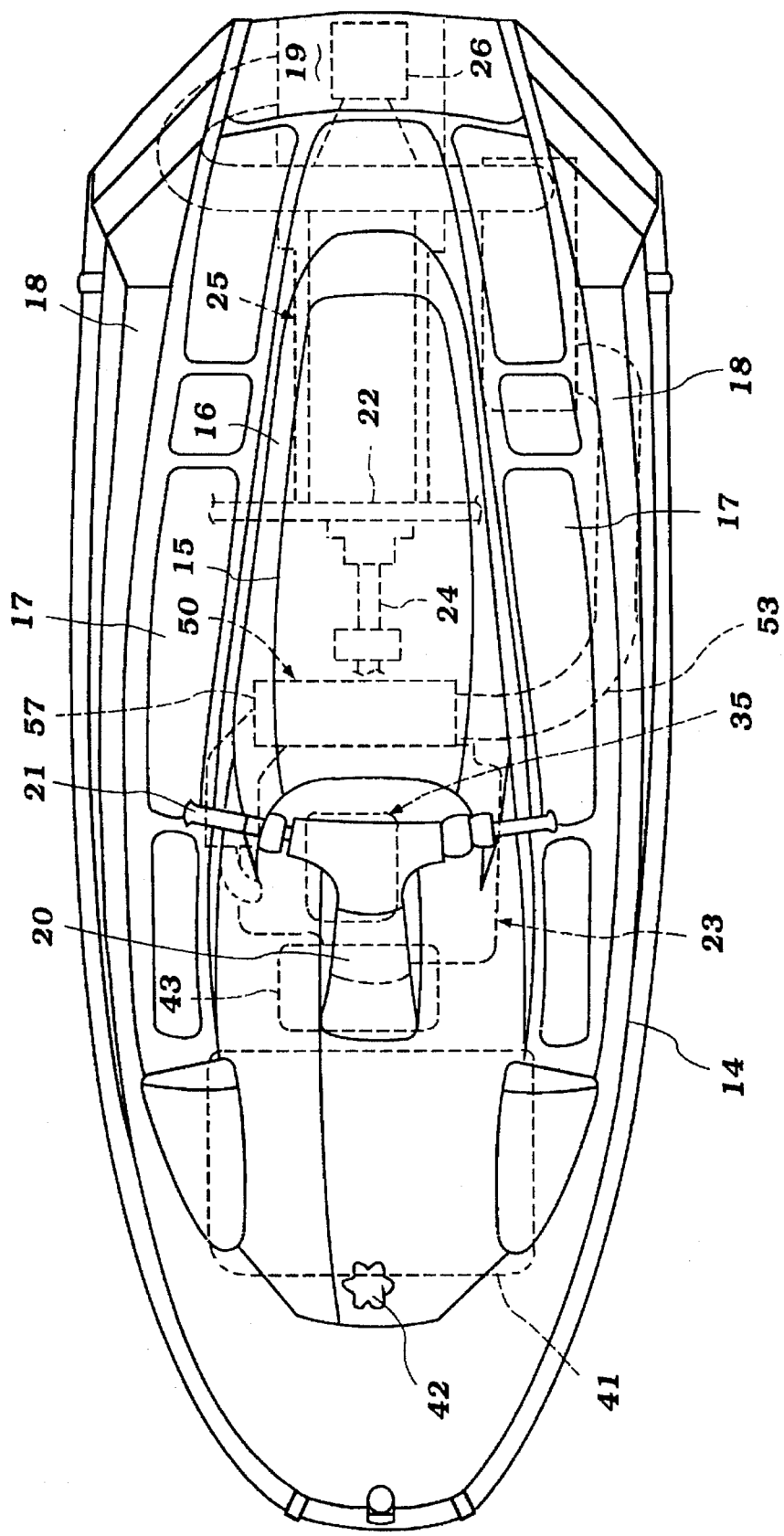
FIG. 2 is a top plan view thereof.

Referring now in detail to the drawings, a personal watercraft constructed in accordance with an embodiment of the invention is identified generally by the reference numeral 11. Although a specific configuration for the watercraft 11 will be described, it should be readily apparent to those skilled in the art that many facets of the invention are adaptable for use with watercraft types considerably different than that disclosed. In addition, many features of the invention are not limited to, but may have primary utility in, personal-type watercraft. That is, a number of the features which are disclosed have ready applicability to more conventional larger-type watercraft.

The watercraft 11 is comprised of a hull, indicated generally by the reference numeral 12, and which is comprised of a lower hull part 13 and an upper deck part 14. These hull parts 13 and 14 may be formed from any suitable material such as a molded fiberglass resin or the like.

The rearward portion of the deck part 14 forms a rider's area through which a longitudinally extending raised straddle-type seat 15 is positioned. The seat 15 is comprised of a lower base 16 which may be formed from the same material as the deck 14 itself. Disposed over this is the seat 15 which may be formed from a cushioning material and which has sufficient length so as to accommodate one or more riders. If plural riders are accommodated, they are seated in straddle-tandem fashion.

The rider's area is completed by a pair of foot areas 17 (FIG. 5) that are disposed on opposite sides of the raised portion 16 and upon which the riders seated on the seat 15 may place their feet. A pair of raised gunnels 18 forms the outer peripheral edge of the rider's area. To the rear of the foot areas 17 and of the raised seat base 16 there is provided a deck area which opens through the transom of the watercraft to define a rear deck 19 via which riders may board the watercraft 11 from the body of water in which the watercraft 11 is operating.

A control mast 20 is disposed forwardly of the seat 15, and it should be noted that the seat cushion 15 has a pair of forwardly extending parts that extend in part beneath this mast and around which the rider/operator may place his knees. A handlebar assembly 21 is mounted at the upper end of the mast 20 for control of certain functions of the watercraft, such as its steering or the like.

The area between the hull portion 13 and deck portion 14 and enclosed thereby forms a closed compartment, the forward part of which comprises an engine compartment. This engine compartment extends at least in part beneath the seat 15 and terminates in a transversely extending bulkhead 22. An internal combustion engine 23, of the type which will be described later, is mounted in this engine compartment and has an output shaft which is connected through a transmission, as will be described, to a drive or impeller shaft 24 that extends rearwardly through the bulkhead 22. The drive shaft 24 drives a jet propulsion unit, indicated generally by the reference numeral 25, which is positioned in a tunnel formed on the underside of the hull portion 13 to the rear of the bulkhead 22.

The jet propulsion unit 25 may be of any known type and for that reason is not illustrated in any detail. However, it basically includes a downwardly facing water inlet portion through which water is drawn from an opening in the underside of the hull portion 13. This water is drawn by an impeller that is affixed to the impeller shaft 24 and is discharged rearwardly through a discharge nozzle to a steering nozzle 26. The steering nozzle 26 is supported for pivotal movement about a vertically extending axis so as to change the direction in which the water is discharged, and thus steer the watercraft, as is well known in this art. The handlebar assembly 21 is coupled suitably to this steering nozzle 26 for effecting this steering operation.

Figure 3:
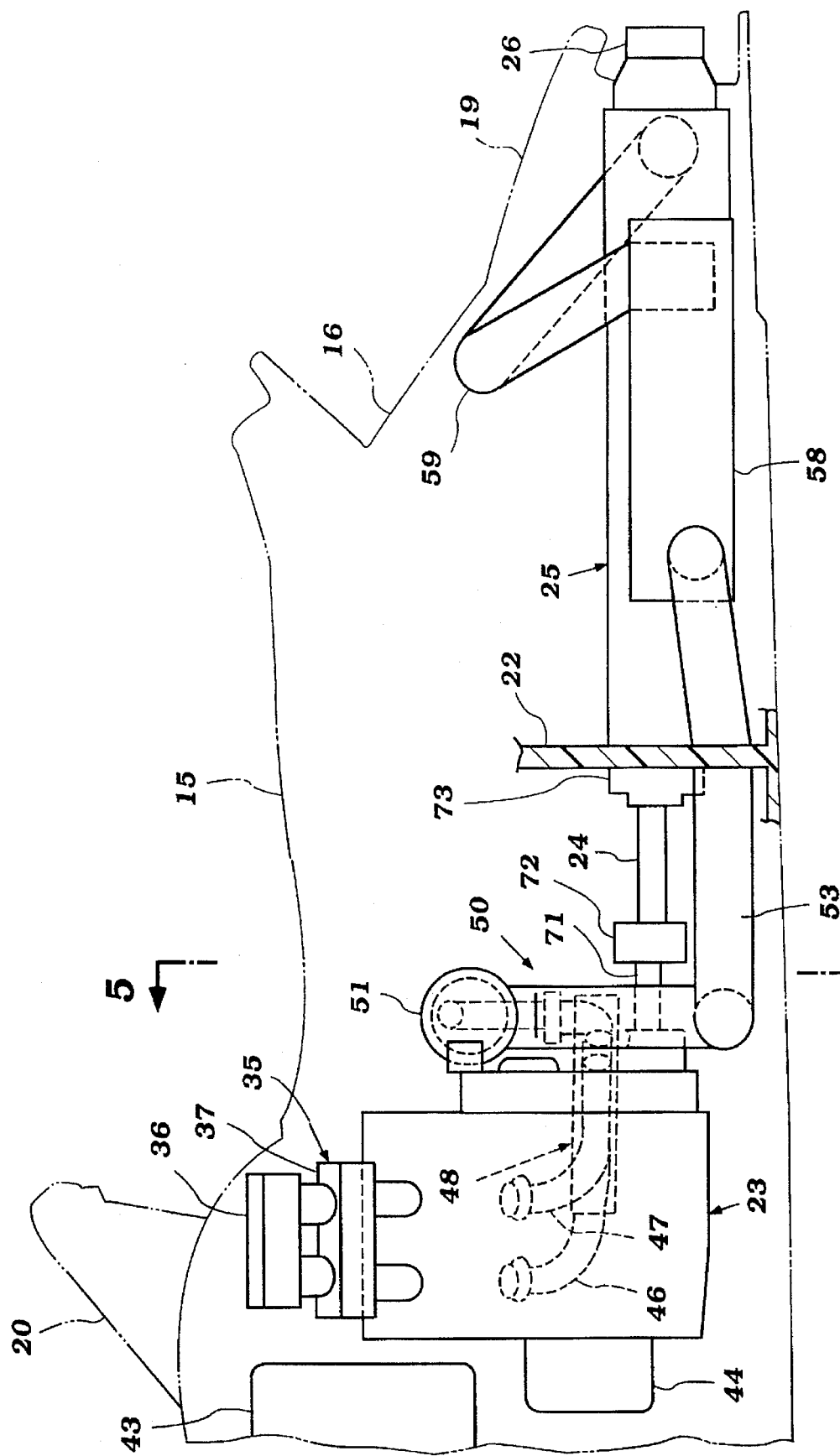
FIG. 3 is an enlarged side elevational view, taken in the same direction as FIG. 1, but shows the bulk of the watercraft in phantom, although the bulkhead between the engine compartment and the tunnel for the propulsion unit is broken away and shown in section.
Figure 4:
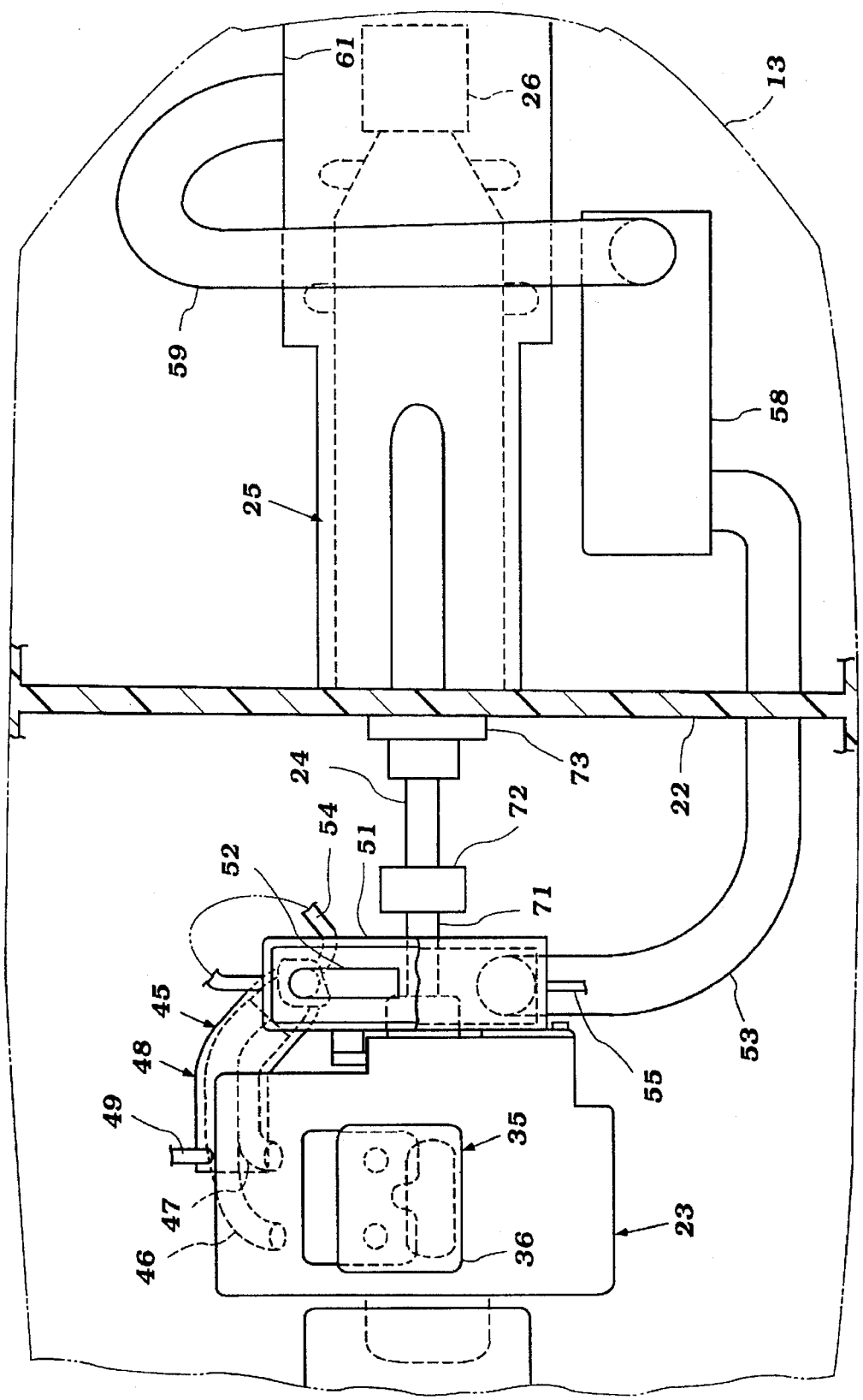
FIG. 4 is an enlarged top plan view showing the same components as in FIG. 3 and is looking in the same direction as FIG. 2.

The engine 23 will now be described, and it appears in most detail in FIGS. 3–5, although certain components of it appear in other figures. The engine 23 is, in the illustrated embodiment, of the two-cylinder in-line type and operates on a four-stroke principle. In addition, the engine 23 is of the double-overhead-cam type. As previously noted however, a number of facets of the invention may be employed in conjunction with engines of other types.

The engine 23 is comprised of a crankcase 27 in which a crankshaft 28 is supported for rotation about a longitudinally extending axis. As may be seen in FIG. 5, this axis is offset slightly to one side of a vertically extending longitudinal plane 29 which defines a center plane of the watercraft hull 12. The impeller shaft 24 rotates about an axis that lies in this center plane.

A cylinder block 31 forms a cylinder bank that extends vertically upwardly from the crankcase 27 and defines a pair of aligned cylinder bores that have their axes lying on a plane 32 that is disposed at an acute angle to the center plane 29 and which contains the axis of rotation of the crankshaft 28.

A cylinder head assembly 33 is affixed to the cylinder block 31 in a known manner and closes the cylinder bores formed therein. The cylinder head 33 journals a pair of overhead camshafts and is closed by a cam cover 34. Except for the location of the crankshaft 28 and the orientation of the cylinder block 31, cylinder head 33, and certain external auxiliaries, the internal construction of the engine 23 forms no part of the invention. A further description of it is not required to permit those skilled in the art to practice the invention. Where any details of the construction of the engine 23 are omitted, they may be considered to be conventional.

An important feature of the invention, however, is the canting of the cylinder bore axis containing plane 32 from the vertical. As seen in FIG. 5, this permits the engine 23 to be positioned beneath the raised seat base portion 16 and still maintain a low center of gravity and a relatively narrow width. This narrow width is important due to the fact that the riders sit on the seat 15 in straddle fashion, as aforenoted.

An induction system, indicated generally by the reference numeral 35, is provided in the area of the engine compartment above the cylinder head 33 and directly beneath the seat portion 23 and the mast 20. This induction system 35 includes an air inlet device 36 which draws atmospheric air from within the engine compartment. This air is, in turn, transferred to a plenum chamber 37 which, in turn, supplies air to charge formers 38 such as carburetors which feed the intake ports of the engine either directly or through an interposed manifold system. It should be noted that the induction system 35 defines a pair of flow axes 39 which lie in a plane that is disposed at an angle to the cylinder bore containing plane 32 and which is offset to the other side of a vertical plane. However, this axis also lies generally on the same side as the longitudinal center plane 29 of the watercraft. Said another way, the induction system is disposed primarily on the same side of the plane 29 as the cylinder block 31 and cylinder head 33.

Fuel is supplied to the charge formers 38 or other charge-forming system of the engine from a forwardly positioned fuel tank 41. This fuel tank 41 is disposed generally centrally within the hull 12 at a forward location so as to maintain the desired fore and aft balance for the watercraft 11. The fuel tank 41 has a forwardly disposed fill neck 42 that is accessible from externally of the watercraft 11 for refueling.

Also, a storage locker or storage compartment 43 is formed at the front of the deck portion 14 beneath the mast 20 and is accessible through a suitable hatch cover. This storage compartment 43 is disposed generally forwardly of the engine induction system 35.

A pair of spark plugs (not shown) are mounted in the cylinder head 33 for firing the charge inducted into the engine cylinders through the induction system 35. These spark plugs are fired by an ignition circuit that includes a magneto generator 44 that is driven off the front of the crankshaft 28 and which is disposed at the front of the engine and beneath the storage compartment 43. The storage compartment 43 may be provided with a false bottom through which the magneto generator 44 may be accessed for service purposes.

As should be apparent from the foregoing description, the induction system 35 delivers the fuel-air mixture to intake ports formed in the cylinder head 33 on the upper side thereof. This charge is delivered to the combustion chambers through intake passages formed in the cylinder head 33.

The burnt charge is delivered through exhaust ports formed on the lower side of the cylinder head 33 and which face generally downwardly to an exhaust manifold, indicated generally by the reference numeral 45. This exhaust manifold 45 is comprised of a pair of runner sections 46 and 47, each of which collects the exhaust gases from a respective exhaust port and delivers it to an expansion chamber type of device, indicated by the reference numeral 48, and which may be considered to form a collector section of the exhaust manifold 45. This collector section 48 is of a double-wall construction, and thus forms a water jacket that surrounds the exhaust manifold pipes 46 and 47. It should be noted that the pipes 46 and 47 extend downwardly and then turn rearwardly and terminate behind a rear face of the engine 23.

The engine 23 is water cooled, and water for its cooling purposes is drawn from the body of water in which the watercraft is operated, in any well-known manner. In order to assist in silencing and to provide some cooling for the exhaust manifold 45, water is delivered to the water jacket formed around the expansion chamber device through a supply conduit 49. Either all or a substantial portion of the cooling water from the engine is delivered to this jacket through the conduit 49. It should be noted that this water is not, at this point, mixed with the exhaust gases.

It should be obvious from the foregoing description that the described configuration means that the exhaust manifold 45 actually lies below the exhaust ports. Thus, this raises a risk that water might enter the engine through the exhaust system. However, in order to preclude this possibility, there is provided a transversely extending trap system indicated generally by the reference numeral 50 which includes an expansion chamber 51 which has a generally cylindrical configuration and which extends transversely across the rear of the engine but at a level that is at least as high or higher than the exhaust ports which the exhaust manifold runners 46 and 47 serve. The exhaust gases are delivered to this expansion chamber 51 through a generally L-shaped pipe section 52 which extends upwardly from the discharge end of the exhaust manifold 45 and may, in fact, form an integral portion of it. These exhaust gases can expand in the expansion chamber 51 for further silencing and then are discharged at the opposite end thereof through a discharge pipe 53.

The expansion chamber device 51 is also formed with a double-wall construction, and this double-wall construction forms a further water jacket. Cooling water is delivered to this water jacket from the exhaust manifold cooling jacket formed around the expansion chamber 48 by a flexible conduit 54. This water enters one end of the expansion chamber 51 and flows transversely across it for discharge through a discharge conduit 55. This discharge conduit 55, in turn, discharges to an inlet conduit 56 of a cooling jacket section 57 which encircles the exhaust pipe 53. This cooling jacket 57 discharges the spent cooling water into the exhaust system at this point through a plurality of nozzle-like spray openings.

The water is thereafter mixed with the exhaust gases. However, since this introduction takes place on the low side of the expansion chamber 51, there is not any likelihood that the water can flow back into the engine through the exhaust system. Also, note that the pipe 52 that delivers the exhaust gases to the chamber 51 extends to its upper end, and this further assists in the trap-like operation of the exhaust system trap 50.

The exhaust pipe 53 extends rearwardly along the side of the engine opposite the exhaust manifold 45, through the bulkhead 22, and enters into a water trap device 58 that is formed on one side of the tunnel that contains the jet propulsion unit 25. This water trap device 58 is of any known type and may include internal baffles that will permit the exhaust gases to flow freely. However it forms a sufficient volume area to permit water to collect before it can flow upwardly to the engine through the exhaust system, even though the watercraft may have been inverted and subsequently righted.

A tailpipe 59 extends out of the water trap device 58 across the top of the jet propulsion unit 25 and the tunnel which contains it and discharges through a side wall 61 of the tunnel at a level that is at or near the water level. Although this type of discharge is incorporated, the trap-like arrangement of the exhaust system will ensure that any water which may enter the exhaust pipe 59 cannot flow back to the engine. The exhaust pipe 58 itself forms a trap section, and the pipe 58 operates as a further water trap. Also, as has been noted, the water trap 50 including the expansion chamber 51 also functions as a water trap because of the fact that it is higher than the discharge end of the exhaust pipe 59 and also higher than the exhaust ports with which the manifold runners 46 and 47 cooperate.

It has been noted that the engine crankshaft axis 28 is offset from the impeller shaft 24 and its axis which lies on the plane 29 (FIG. 5). In order to transmit the drive therebetween and to provide a step-down transmission, there is provided a two-stage transmission comprised of a first step-down gear transmission, indicated generally by the reference numeral 62, and a second step-up chain or belt transmission 63. These transmissions 62 and 63 are contained within a transfer case 64 that may be either formed separately from or as a part of the engine assembly. Preferably, a separate cover piece affixed to the cylinder block 31 and crankcase 27 forms this transmission closure.

The gear transmission 62 includes a driving gear 65 that is affixed to the crankshaft 68 and which drives a driven gear 66 that is rotatably journaled on an idler or intermediate shaft. The axis of this intermediate shaft lies on the same side of the plane 29 as the crankshaft axis, but at a substantially higher level than it. The actual ratio between the gears 65 and 66 will depend upon the total step-down that is required.

Affixed for rotation with the driven gear 66 and journaled on the aforenoted intermediate shaft is a driving sprocket 67. This sprocket drives a drive chain or belt 68 which forms a portion of the second transmission 63. This drive belt or chain 68 encircles a driven pulley or sprocket 69 that is affixed to a stub shaft 71 that is aligned with and spaced forwardly of the drive shaft 24. These shafts 71 and 24 are connected to each other by a suitable elastic coupling 72.

The impeller shaft 24 extends rearwardly through the bulkhead 22 as aforenoted and is journaled by a bearing 73 mounted on the forward side of the bulkhead 22. The ratio of the transmission 62 and 63 is such that the stub shaft 71 and impeller shaft 24 are rotated at a substantially slower rate of speed than the crankshaft 28 for the reasons aforenoted.

Finally, the crankshaft 28 may also contain a gear or sprocket (not shown) that drives the aforenoted camshafts for the engine.

From the foregoing description it should be readily apparent that the described construction provides a very compact power unit for a watercraft such as a personal watercraft.

The power unit can be easily serviced and is positioned at least in part beneath the rider's seat. This which will ensure that the impeller shaft is driven at the appropriate speed while the engine can be operated at a high speed to obtain high efficiency. In addition, the exhaust system will ensure that water cannot enter the engine through the exhaust system. All of this is achieved with a compact construction, as should be readily apparent.

Of course, the foregoing description is that of a preferred embodiment of the invention, and various changes and modifications may be made without departing from the spirit and scope of the invention, as defined by the appended claims.

I claim:

1. A watercraft having a hull, and an internal combustion engine contained in said hull for propelling said watercraft, said engine comprising a crankcase containing a crankshaft rotatable about an axis longitudinally disposed in said watercraft hull, a cylinder bank extending upwardly from said crankcase and inclined to a vertical plane containing said crankshaft axis, at least one exhaust port in said cylinder bank facing in a generally downward direction, an exhaust manifold for collecting exhaust gases from said exhaust port and delivering them in a downward direction and then toward one end of said engine, an expansion chamber device extending transversely across said one end of said engine and to which exhaust gases are delivered by said exhaust manifold, an exhaust pipe having a discharge for discharging exhaust gases from said expansion chamber device to the atmosphere, said expansion chamber device being positioned at least in part vertically above said exhaust port and said exhaust pipe discharge for forming a trap for precluding the likelihood of water entering the engine through the exhaust system.

2. A watercraft having a hull, and an internal combustion engine as in claim 1, wherein the cylinder bank is provided with a plurality of in-line cylinders, each having at least one exhaust port served by the exhaust manifold.

3. A watercraft having a hull, and an internal combustion engine as in claim 2, wherein the exhaust manifold comprises a plurality of runner sections, each extending from a respective exhaust port and terminating in a collector section that communicates with the expansion chamber device.

4. A watercraft having a hull, and an internal combustion engine as in claim 3, further including means forming a water jacket around the expansion chamber device and means for circulating cooling water through said expansion chamber water jacket.

5. A watercraft having a hull, and an internal combustion engine as in claim 4, further including means forming a cooling water jacket around the exhaust manifold and means for circulating water through said cooling water jacket.

6. A watercraft having a hull, and an internal combustion engine as in claim 5, wherein the water from the exhaust manifold and expansion chamber device cooling jackets is discharged into the exhaust pipe downstream of the expansion chamber device.

7. A watercraft having a hull, and an internal combustion engine as in claim 2, wherein the exhaust pipe discharges exhaust gases to the atmosphere in an area contiguous to the level of water in which the watercraft is operating.

8. A watercraft having a hull, and an internal combustion engine as in claim 7, further including means defining a water trap in the portion of the exhaust pipe downstream of the expansion chamber device and upstream of the exhaust pipe discharge.

9. A watercraft having a hull, and an internal combustion engine as in claim 8, further including a propulsion device disposed at one end of the engine and driven by the crankshaft for propelling the watercraft.

10. A watercraft having a hull, and an internal combustion engine as in claim 9, wherein the propulsion device is disposed to the rear of the engine and the expansion chamber device is also positioned to the rear of the engine.

11. A watercraft having a hull, and an internal combustion engine as in claim 10, wherein the propulsion device comprises a jet pump.

12. A watercraft having a hull, and an internal combustion engine as in claim 11, wherein the jet pump is positioned in a tunnel formed on the underside of the hull.

13. A watercraft having a hull, and an internal combustion engine as in claim 12, wherein the water trap device is disposed on one side of the tunnel and the exhaust pipe discharge is disposed on the other side of the tunnel and the exhaust pipe extends over the tunnel to form a further water trap.

14. A watercraft having a hull, and an internal combustion engine as in claim 13, wherein the watercraft is provided with a deck portion at the rear end thereof and wherein the portion of the exhaust pipe that forms a further water trap extends upwardly and forwardly from the water trap device and transversely across the jet propulsion unit and is positioned beneath and in part forwardly of the watercraft hull rear deck.

15. A watercraft having a hull, and an internal combustion engine as in claim 10, wherein the engine operates on a four-cycle principle.

16. A watercraft having a hull, and an internal combustion engine as in claim 15, wherein the engine has overhead valves and the cylinder bank includes a cylinder head at the upper end of a cylinder block and in which the exhaust ports are formed.

17. A watercraft having a hull, and an internal combustion engine as in claim 16, further including an induction system on the side of the cylinder head opposite that through which the exhaust ports extend and extending generally vertically upwardly from the engine for delivering a fuel-air charge to the engine.

18. A watercraft having a hull, and an internal combustion engine as in claim 17, wherein the hull defines a passenger's compartment having a longitudinally extending seat adapted to accommodate a rider seated in straddle fashion and wherein the engine is positioned at least in part beneath the seat.

19. A watercraft having a hull, and an internal combustion engine as in claim 9, wherein the engine crankshaft rotates about an axis that is parallel to, but offset from, a drive shaft for the propulsion unit and further including transmission means for driving the drive shaft from the crankshaft.

20. A watercraft having a hull, and an internal combustion engine as in claim 19, wherein the transmission means comprises an intermediate shaft journaled for rotation about an axis extending parallel to the drive shaft axis and the crankshaft axis and positioned to one side and above said drive shaft and said crankshaft axes, said transmission means comprising a first transmission driving said intermediate shaft from said crankshaft and a second transmission driving said drive shaft from said intermediate shaft.

21. A watercraft having a hull, and an internal combustion engine as in claim 20, wherein the transmission means provides a step-down ratio so that the drive shaft rotates at a slower speed than the crankshaft.

22. A watercraft having a hull, and an internal combustion engine as in claim 21, wherein one of the transmissions comprises an intermeshing gear transmission.

23. A watercraft having a hull, and an internal combustion engine as in claim 22, wherein the other transmission comprises a flexible transmitter transmission.

24. A watercraft having a hull, and an internal combustion engine as in claim 23, wherein the first transmission is the intermeshing gear transmission and the second transmission is the flexible transmitter transmission.

25. A watercraft having a hull, and an internal combustion engine as in claim 1, further including means forming a cooling water jacket around the exhaust manifold and means for circulating water through said water jacket.

26. A small personal watercraft comprised of a hull defining a passenger's area at the rear thereof, said hull having an underside and a raised portion extending longitudinally through said passenger's area with lower foot areas on the sides thereof for providing a seat for at least one rider seated in straddle fashion therein, a rear deck formed to the rear of said rider's area at a level below said seat and forming an extension of said foot areas and on which a rider may stand, an internal combustion engine mounted in said hull, a jet propulsion unit recessed in the underside of said hull at the rear of said hull and extending in part beneath said rear deck and driven by said engine for propelling said hull, said engine having at least one exhaust port exhausting into an exhaust pipe that extends longitudinally within said hull along one side of said jet propulsion unit, and a water trap formed by said exhaust pipe by a portion of said exhaust pipe that extends upwardly and transversely across said hull beneath said rear deck and discharges into the atmosphere at the other side of said jet propulsion unit at a level substantially the same as the level of said jet propulsion unit.

27. A small personal watercraft as in claim 26, wherein the water trap section of the exhaust pipe extends upwardly and forwardly and is disposed at least in part beneath said raised seat.

28. A small personal watercraft as in claim 27, wherein the raised seat has a rearwardly and downwardly tapering end section beneath which the exhaust pipe water trap is formed.

29. A watercraft having a hull, and an internal combustion engine contained in said hull for propelling said watercraft, said engine comprising a crankcase containing a crankshaft rotatable about an axis longitudinally disposed in said watercraft hull, a cylinder bank extending upwardly from said crankcase and inclined to a vertical plane containing said crankshaft axis, at least one exhaust port at one side of said cylinder bank for discharging exhaust gases therefrom, an exhaust manifold for collecting exhaust gases from said exhaust port and extending along said one side of said engine toward one end of said engine, an expansion chamber device extending transversely across said one end of said engine and to which exhaust gases are delivered by said exhaust manifold, an exhaust pipe having a discharge for discharging exhaust gases from said expansion chamber device to the atmosphere, said expansion chamber device being positioned at least in part vertically above said exhaust port and said exhaust pipe discharge for forming a trap for precluding the likelihood of water entering the engine through the exhaust system.

30. A watercraft as in claim 29, wherein the cylinder bank is provided with a plurality of in-line cylinders, each having at least one exhaust port served by the exhaust manifold.

31. A watercraft as in claim 30, wherein the exhaust manifold comprises a plurality of runner sections, each extending from a respective exhaust port and terminating in a collector section that communicates with the expansion chamber device.

32. A watercraft as in claim 30, wherein the exhaust pipe discharges exhaust gases to the atmosphere in an area contiguous to the level of water in which the watercraft is operating.

33. A watercraft as in claim 32, further including means defining a water trap in a portion of the exhaust pipe downstream of the expansion chamber device and upstream of the exhaust pipe discharge.

34. A watercraft as in claim 30, further including a propulsion device disposed at one end of the engine and driven by the crankshaft for propelling the watercraft.

35. A watercraft as in claim 29, wherein the propulsion device comprises a jet pump.

36. A watercraft as in claim 35, wherein the jet pump is positioned in a tunnel formed on the underside of the hull.

37. A watercraft as in claim 36, wherein the water trap device is disposed on one side of the tunnel and the exhaust pipe discharge is disposed on the other side of the tunnel and the exhaust pipe extends over the tunnel to form a further water trap.

* * * * *